Feb. 2, 1960 W. H. COX 2,923,367
METHOD AND APPARATUS FOR SEISMIC SURVEYING
Filed Oct. 6, 1952 3 Sheets-Sheet 1
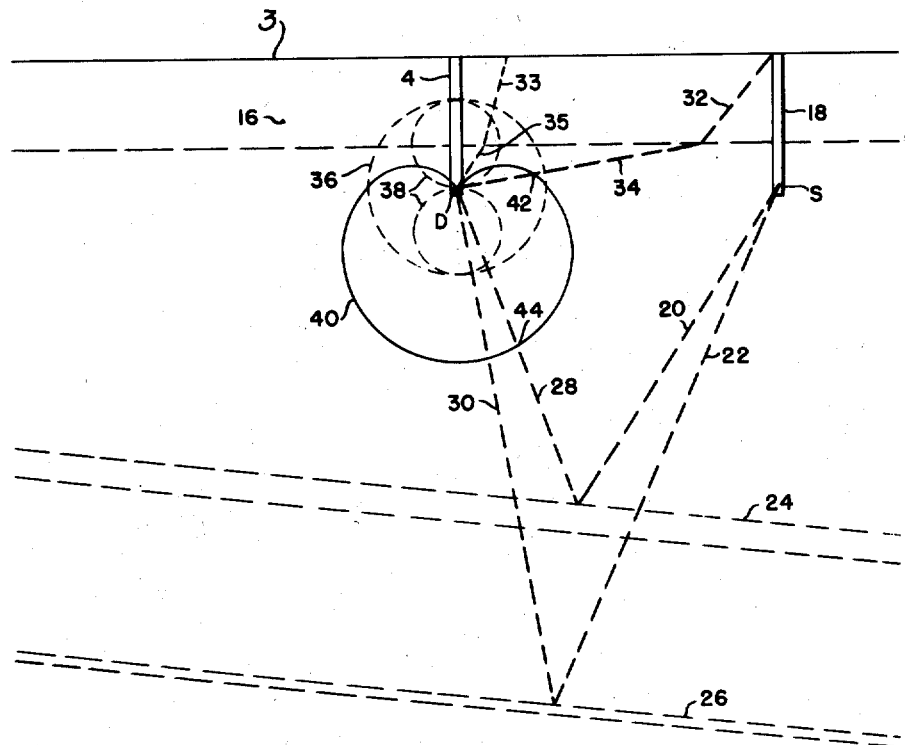
FIG. 2.
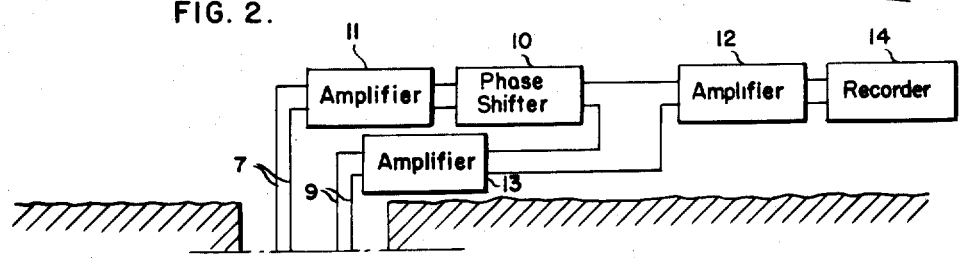
FIG. 1.
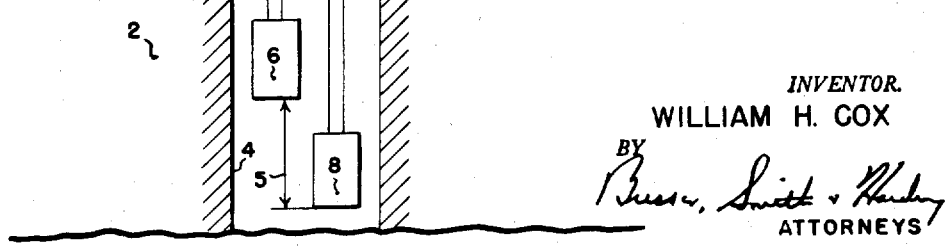
INVENTOR.
WILLIAM H. COX
BY
ATTORNEYS Feb. 2, 1960   W. H. COX   2,923,367
METHOD AND APPARATUS FOR SEISMIC SURVEYING
Filed Oct. 6, 1952   3 Sheets-Sheet 3

INVENTOR.
WILLIAM H. COX

ATTORNEYS

United States Patent Office 2,923,367
Patented Feb. 2, 1960

2,923,367

METHOD AND APPARATUS FOR SEISMIC SURVEYING

William H. Cox, Orange, Tex., assignor to Sun Oil Company, Philadelphia, Pa., a corporation of New Jersey Application October 6, 1952, Serial No. 313,244

5 Claims. (Cl. 181—.5)

This invention relates to a method and apparatus for seismic surveying and, more particularly, to a method and apparatus for detecting and recording reflected seismographic signals with the inclusion of a minimum amount of unwanted surface noises.

It is conventional practice to place detectors on or slightly below the surface of the earth whenever operating conditions will permit. In some areas the amplitude of undesired energy or noise is so great that it masks the desired reflected energy arriving from below the surface. Conventional practice is to place the detectors in deep bore holes in "noisy" areas in order to separate the detectors as far as possible from the sources of undesired energy at the surface of the earth. Detectors positioned in deep holes, however, are responsive to undesired energy or noise arriving from above the detector.

It is an object of the present invention to provide an arrangement of detectors which is unidirectional and which is, therefore, responsive only to reflected waves arriving from below the detector and which is substantially insensitive to unwanted waves or noises arriving from above the detector.

It is a further object of the present invention to obtain detected signals, which signals may be manipulated and combined to produce a single substantially noise free signal, i.e., a signal including only energy waves reflected to the detectors from subsurface strata and containing substantially no waves arriving at the detector from above the detector.

These and other objects of the invention will become apparent from the following description when read in conjunction with the accompanying drawings, in which:

Figure 1 shows a longitudinal section of a bore hole and, in diagrammatic form, the apparatus involved in the present invention;

Figure 2 shows diagrammatically a section of the earth including a bore hole containing two detectors employed in the present invention and directional response curves of the two detectors;

Figure 3:
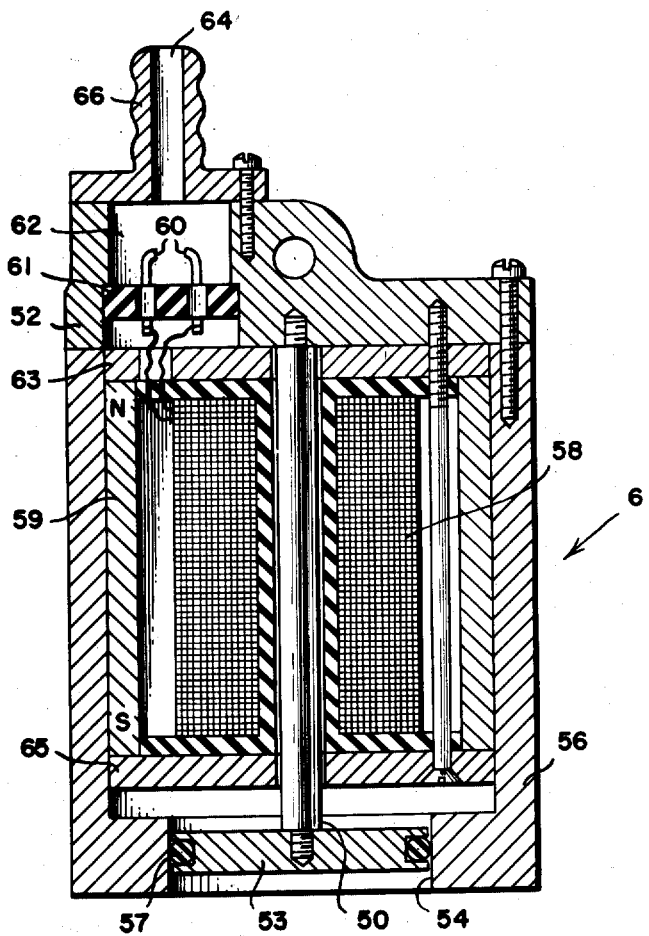
Figure 3 is a longitudinal section of a non-directional detector.

Referring to Figure 1 there is shown in the earth 2 a bore hole 4 extending below the "weathered" or low velocity layer of the earth into the relatively high velocity region below in which are placed two detectors 6 and 8. The detector 6 is a pressure sensitive or non-directional detector surrounded by a fluid in the hole capable of transmitting pressure waves from the earth to the detector. This detector 6 is connected by conductors 7 to an amplifier 11. The output of the amplifier 11 is connected to a phase shifter 10. The detector 8 is a velocity sensitive or bidirectional detector coupled mechanically or acoustically to the sides or bottom of the bore hole so that displacement of the surrounding earth is communicated to it. This detector 8 is connected by conductors 9 to an amplifier 13. The output of the amplifier 13 is connected in series with the output of the phase shifter 10 to an amplifier 12. The output of the amplifier 12 is delivered to a recorder 14.

In Figure 2 there is shown the bore hole 4 extending downwardly from the earth surface 3 and extending through the weathered earth layer 16. The two detectors 6 and 8 are positioned together at the point indicated at D within the bore hole 4.

A second bore hole 18 displaced from the bore hole 4 also extends through the weathered layer 16 and contains the explosive charge which is detonated at the shot point indicated at S. Energy waves passing downwardly from the shot point S are indicated at 20 and 22 and are reflected upwardly from subsurface earth strata 24 and 26, respectively, as indicated at 28 and 30. Surface noises passing downwardly through the weathered layer, as indicated at 32 and 33, are refracted and arrive at the detectors as indicated at 34 and 35.

Figure 3 shows a typical non-directional detector of a type which is adapted to be lowered into the liquid contained within a bore hole and includes a rod 50 of magnetostrictive material which is adapted, upon change in stress, to give rise to a change in its magnetic properties as is commonly known. The upper end of the rod, as viewed in the figure, is secured to a mounting plate 52 and the lower end of the rod is attached to a piston 53 which is exposed through a bore 54 in a cup-shaped retainer member.

An O-ring 57 or other suitable packing is provided to seal the piston within the retainer member 56.

A coil 58 is mounted within the retainer member 56 and is wound on a suitable form around the magnetostrictive rod 50. The coil is insulated in the conventional manner by suitable insulating materials and is connected to terminals 60 which extend upwardly through an insulating bushing 61 in the mounting plate 52 into a junction space 62 wherein conductors passing through the bore 64 in the nipple 66 may be connected to terminals 60. The coil 58 is enclosed by a sleeve magnet 59 and disc shaped pole pieces 63 and 65. The sleeve magnet 59 produces a polarizing magnetomotive force lengthwise in the magnetostrictive rod 50. Changes in magnetic properties of the magnetostrictive rod with stress changes due to pressure variation on the piston 53 will vary the magnetic flux linking the coil 58 and thus induce a voltage in it which will appear at the terminals 60. The conductors, such as the conductors 7 shown in Figure 1, will pass through an enclosing tube which protects the conductors from the liquids within the bore hole and the tube will be drawn over the nipple 66 and clamped thereto in a conventional manner.

This type of detector, when lowered into the liquid in a bore hole, produces an electrical signal responsive to pressure waves passing through the liquid and is, therefore, non-directional in its response.

Figure 4:
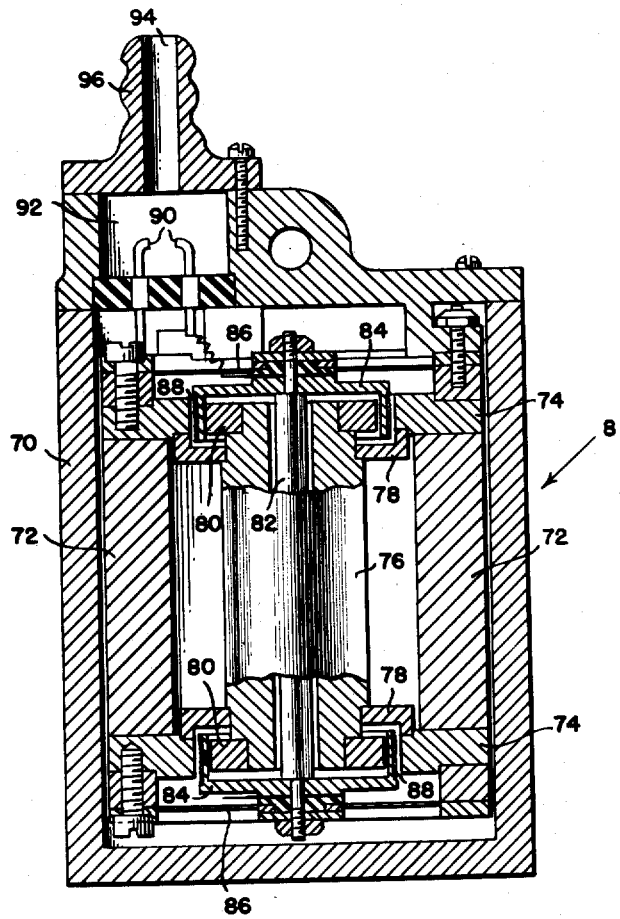
Figure 4 is a longitudinal section of a bidirectional detector.

Figure 4 shows a bidirectional detector including, within a housing 70, a magnetic path formed by an annular magnetic member 72, pole pieces 74, a central core 76 which is supported from the pole pieces by means of non-magnetic spacers 78 and annular air gaps between the pole pieces 74 and annular members 80 affixed to the core 76.

A suspended system including a rod 82 of non-magnetic material having affixed at each end coil forms 84 is supported by means of suitable flat spring structures 86 which may be in the form of a conventional "spider." Coils 88 are wound on the coil forms 84 and are adapted to be oscillated within the air gap in the magnetic circuit previously described when the detector is subjected to seismic vibrations. The coils are connected to the terminals 90 which extend into a junction space 92 and to which conductors, passing through the bore 94 in the nipple 96, may be connected. The nipple 96 is provided for the engagement of the protective covering for the cables passing into the bore hole which are connected to the terminals 90. This type of detector is described in greater detail in Patent 2,533,249, issued to Robert L. Henson, Jr.

This type of detector, when lowered into the liquid in a bore hole, produces an electrical signal responsive to earth displacement waves and is commonly referred to as an inertia type detector. As is well known, this type of detector is bidirectional in its response.

If, for example, the detector 6 in Figure 1 is a non-directional type of detector, it will be responsive to a uniform degree to signals arriving at it from any direction. The directional response curve of a non-directional type of detector is indicated by the dotted circle 36 in Figure 2. If the detector 8 in Figure 1 is a bidirectional type of detector, it will be responsive to waves received from above and below the detector and will be substantially insensitive to waves arriving at the detector horizontally. A bidirectional response curve is indicated by the dotted circles 38 in Figure 2. The output signals from the detectors 6 and 8 are amplified by the amplifiers 11 and 13, respectively, to provide signals of equal amplitude in response to a wave arriving at the detectors from a point immediately above or immediately below the detectors as indicated by the dotted circles 36 and 38 in Figure 2. By combining or mixing the electrical signal outputs of these two detectors, a substantially unidirectional response will result. This response is represented by the cardioidal curve 40 shown in Figure 2.

The desirability of obtaining this type of response will be evident when it is considered that the combined detector response to a surface noise wave passing along line 32—34 will have a magnitude related to the length of the line 34 from the detector location D to the point 42 where the line 34 crosses the curve 40, the detector response to a surface noise wave passing along the line 33—35 will be substantially zero and the detector response to a wave passing upwardly along the line 28 will have a magnitude related to the length of the line 28 between the detector location D and the point 44 where the line 28 crosses the curve 40. Thus the combined response of the two detectors to a wave from a point immediately below the detectors is additive and will equal two times the response of one of the detectors. Conversely, the response to noises arriving from directly above the detectors will cancel each other and the total response will be zero as in the case of noise arriving along the path 33—35 in Figure 2.

When a shot is fired at the shot point S, an earth displacement wave resulting therefrom and reflected from a particular strata actuates the two detectors. The pressure responsive detector 6 is responsive to the pressure wave which accompanies a longitudinal displacement wave reaching the detector while the velocity responsive detector 8 is responsive to the vertical component of velocity due to the displacement wave. Pressure variation at a given point several wave lengths away from the source, where essentially plane waves exist, is in phase with and proportional to the absolute magnitude of velocity at that point. The pressure responsive detector described, however, has an output voltage proportional to the first time derivative of pressure due to the nature of electromagnetic induction. The output of this detector for sinusoidal components of pressure variation, therefore, is displaced 90 degrees from the incoming pressure wave and its amplitude is directly proportional to frequency. Effect of the mechanical vibrating system is ignored since its effect on response can easily be made negligible by proper design as is commonly known. The velocity sensitive detector can be made to have essentially uniform response and negligible phase shift over the desired frequency range by proper adjustment of its natural period and degree of damping as is commonly known.

Phase differences in the response of the pressure and velocity responsive detectors cannot be corrected accurately over the range of frequencies required for seismographic exploration by introducing a fixed time delay. Such a scheme could only be in exact adjustment at one frequency where a delay of 90° or one-fourth the period of the wave is produced. The correction needed is equivalent to integration of the output of the pressure responsive element or differentiation of the output of the velocity responsive elements. It is necessary, therefore, that the output signals of the two detectors be corrected for phase response differences prior to their combination. This may be accomplished by a phase shifter, such as shown at 10 in Figure 1, which may employ any of a number of conventional and well known phase shifting or integrating circuits. The two detectors 6 and 8 are shown in Figure 1 as being displaced one above the other by a distance indicated by the numeral 5. If desired, such a displacement may be employed to assist in the compensation of the displacement between the two detector output waves but preferably this correction will be made entirely by the phase shifter.

In the foregoing description the two detectors have been referred to as being separate units. It will be evident, however, that the two detector elements could be combined in a single enclosure for convenience in handling. It is also noted that phase and amplitude correction are necessary only to compensate for the deficiencies in the detector elements used. Detectors with ideal pressure and velocity response characteristics would require only adjustment to provide equal amplitude response and proper relative polarity.

While in this embodiment of the invention disclosed herein specific magnetostriction and inertia type detectors have been employed, it will be evident that variously constructed detectors may be employed provided one is non-directional and the other is bidirectional or that their outputs may be combined in such a manner as to provide a resultant unidirectional response.

An alternate method of obtaining unidirectional response is by employing two detectors spaced a substantial distance one above the other, but not over one quarter wave length at the highest frequency to be recorded. In this method the two detectors will have the same directional response characteristics. The output signals of the two detectors are combined differentially or with opposite polarity after the output of one of the detectors, the second detector to receive the desired waves, is delayed an amount equal to the time of travel of the waves between the two detectors.

Thus referring to Figure 1 when it is desired to provide substantially unidirectional detection with respect to waves received from below the two detectors, the detectors 6 and 8 will be spaced a substantial distance apart one above the other and the output signals of the detector 6 will be delayed for a time equal to the time required for the waves to pass through the intervening earth between the detector 6 and the detector 8. The waves are thereafter combined with opposite polarities. It will be evident that the difference in output of the two detectors will be greatest when the time difference between the two component outputs is greatest and zero when the time difference is zero. The net time difference in signals from the two detectors is made up of the fixed time delay interposed in the electrical output of the detector 6 and the difference in arrival time of waves reaching the detectors. This difference in arrival time is due to the difference in path length of sound in the earth as influenced by the detector spacing and the direction from which the waves arrive. Waves arriving from below the detectors and indicating desirable information will reach the detector 8 a short interval of time before the same waves reach the detector 6. This time difference will be additive to the fixed time delay interposed in the output of the detector 6 thus producing a maximum of net time difference and hence a maximum response. Waves arriving from directly above the detectors and thus representing undesired signals or noise will reach detector 6 before the same wave reaches detector 8 by a time interval equal to the travel time in the medium between the two detectors. This difference in arrival time will be exactly cancelled by the fixed time delay interposed in the output of detector 6 producing zero time difference and thus zero response for the differentially corrected combination. It can be shown by well known mathematical reasoning that the directional response produced by this detector arrangement is the same as represented by the cardioidal curve 40 shown in Figure 2. In addition any directional characteristics of the individual detectors will be compounded with the basic cardioid pattern.

In this latter form of the invention each of the detectors 6 and 8 will be associated with amplifiers 11 and 13, respectively, and a phase shifter or delay network 10 will be employed to provide the necessary delay in the output of the upper detector 6 before the two outputs are combined or mixed in phase opposition at the input to amplifier 12.

A desirable method of employing the signals obtained by each of the detectors in either of the foregoing methods is to record the signals separately on either a single multichannel magnetic record tape, on separate magnetic record tapes or on other suitable record members. This recording having been made in the field at the time the shot is fired may then be forwarded to a laboratory where the records are individually reproduced through suitable equipment in which each record may be filtered in order to remove therefrom a maximum of unwanted noises and then the two records are superimposed in proper time phase relation in order that the resultant record will have maximum unidirectional characteristics.

It will be evident that these detector arrangements may be employed in various conventional seismic prospecting procedures and that the provision of unidirectional detection will generally materially reduce the amplitude and quantity of unwanted noises in the seismic records obtained, thus materially improving the value of records obtained and facilitating the recording of such records.

What is claimed is:

1. Apparatus for seismic surveying including a pair of detectors positioned within the earth and adapted to be responsive to energy waves passing through the earth, one of said pair of detectors being non-directionally responsive and the other of said pair of detectors being bidirectionally responsive, means for adjusting the relative time phase displacements of the output signals of the two detectors, and means for combining the output signals of the two detectors, the signal resulting from the combination of the output signals of the two detectors being related to waves received at the detectors from substantially only a single direction in the earth.

2. Apparatus for seismic surveying including a pair of detectors positioned within the earth and adapted to be responsive to energy waves passing through the earth, one of said pair of detectors being pressure responsive and the other of said pair of detectors being inertia responsive, means for adjusting the relative time phase displacements of the output signals of the two detectors, and means for combining the output signals of the two detectors, the signal resulting from the combination of the output signals of the two detectors being related to waves received at the detectors from substantially only a single direction in the earth.

3. The method of seismic surveying comprising firing an explosive charge, producing remotely with respect to said explosive charge a first detected signal resulting from waves received from substantially all directions in the earth, producing a second detected signal resulting from waves received from substantially only two directions linearly opposed in the earth, adjusting the relative time phase displacements of the two detected signals and combining and recording the two relatively adjusted signals to produce a record of seismic waves received from substantially only a single direction in the earth.

4. The method of seismic surveying comprising firing an explosive charge, producing remotely with respect to said explosive charge a first detected signal resulting from pressure waves passing in any direction through the earth from said explosive charge, producing a second detected signal resulting from displacement waves from said explosive charge passing through the earth in only two longitudinally opposed directions, adjusting the relative time phase displacements of the two detected signals and combining and recording the two relatively adjusted signals to produce a record of seismic waves received from substantially only a single direction in the earth.

5. In apparatus for seismic prospecting, a pressure-responsive channel including a pressure-sensitive seismic wave detector, a velocity-responsive channel including a velocity-sensitive seismic wave detector, means for combining the output of said channels, and means for recording the combined output of said channels.

References Cited in the file of this patent

UNITED STATES PATENTS

| 1,959,004 | Owen | May 15, 1934 |
| 2,087,702 | Peters | July 20, 1937 |
| 2,257,187 | Owen | Sept. 30, 1941 |
| 2,331,624 | Parr | Oct. 12, 1943 |
| 2,740,945 | Howes | Apr. 3, 1956 |